G. SCHOCK.
Mash-Stirrer.

No. 228,222.  Patented June 1, 1880.

Witnesses:
John C. Tunbridge.
William H. C. Smith.

Inventor:
Gustav Schock
by his attorney
A. v. Briesen

UNITED STATES PATENT OFFICE.

GUSTAV SCHOCK, OF NEW YORK, N. Y.

MASH-STIRRER.

SPECIFICATION forming part of Letters Patent No. 228,222, dated June 1, 1880.

Application filed January 12, 1880.

*To all whom it may concern:*

Be it known that I, GUSTAV SCHOCK, of the city, county, and State of New York, have invented a new and Improved Stirrer for Mash-Tubs, of which the following is a specification.

My invention relates to improvements in the apparatus employed in stirring and agitating the mash in the mash-tub; and the object of my improvements is to produce a more thorough stirring of the mash by arranging the apparatus so that it will agitate and stir the mash by throwing it laterally to and from the center of the tub in addition to the vertical and circular agitation and stirring to which it is ordinarily subjected.

My invention consists in providing the stirring apparatus with obliquely-set paddles placed on the horizontal revolving shafts which carry the paddles, that are set parallel to the said shafts, some of the said oblique paddles being arranged to throw the mash toward the center, while others are arranged to throw it from the center to the sides.

The invention also consists of a horizontal scraper placed near the bottom of the tub and connected with the stirring apparatus, said scraper having wings at the ends bent outwardly in opposite directions. The scraper when the stirrer revolves acts to throw the mash upward from the bottom and simultaneously to give it a lateral throw to and from the center.

The invention also consists of other details of improvement, which will be more fully referred to and described in connection with the drawings.

Figure 1:
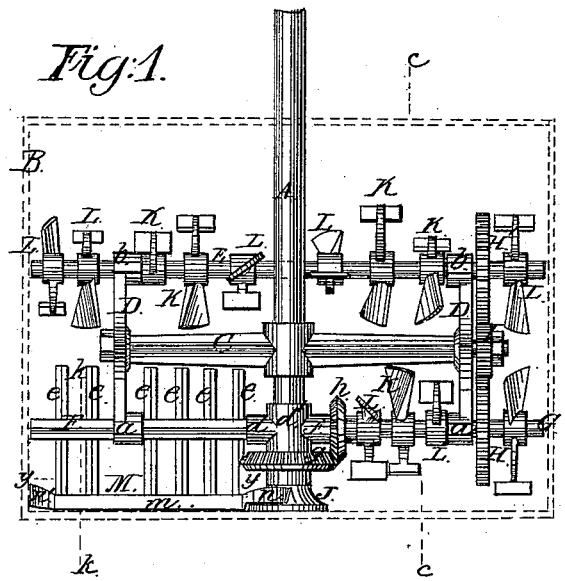
Figure 2:
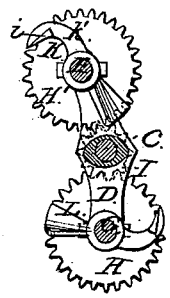
Figure 3:
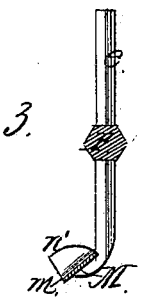
Figure 5:
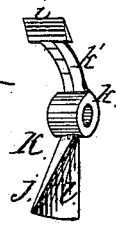
Figure 6:
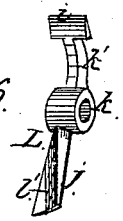
Figure 4:

In the accompanying drawings, Figure 1 is a side elevation of my improved stirrer, with the mash-tub represented in dotted lines. Fig. 2 is a vertical section of the same, taken on line $c\ c$ of Fig. 1. Fig. 3 is a sectional detail of the scraper and part of the rake, taken on line $k\ k$ of Fig. 1. Fig. 4 is a horizontal section of the rake, taken on line $y\ y$ of Fig. 1, and showing also the scraper in plan. Figs. 5 and 6 are perspective views of the stirring-paddles.

Referring to the drawings, A represents the central vertical revolving shaft of the stirrer, and B represents, in dotted lines, the mash-tub.

On the central shaft, A, is fixed a T-shaft, C. To the ends of the shaft C are affixed arms D D, the lower ends whereof are in line with the lower part of the shaft A, while the upper ends extend upwardly from the shaft C, and are bent aside to form an angle with the lower parts, as shown in Fig. 2, and the upper ends, $b$, are provided with bearings, in which is journaled a horizontal shaft, E, parallel to the shaft C.

Below the shaft C, on one side of the central shaft, A, is held in the end $a$ of one of the arms D, and in a socket-piece, $d$, projecting from the sleeve $d'$, a horizontal rod or bar, F. The sleeve $d'$ embraces the shaft A. The horizontal rod or bar F carries a number of vertical bars, $e$, which form the rake of the stirrer.

On the opposite side of shaft A from the rake is placed a horizontal shaft, G, the inner end whereof is journaled in a projection, $f$, of the sleeve $d'$, while the opposite end is passed through a bearing, $a$, in the lower end of the other arm D.

H H' are spur-gear wheels fixed to the corresponding ends of shafts E G, and these spur-wheels mesh with an idle-wheel, I, hung on the end of the T-shaft C.

The lower end of the rotating shaft A is stepped in a fixed base or socket piece, J, and to this fixed base-piece J is fixed a stationary beveled-gear wheel, $g$, which meshes with a beveled wheel, $h$, on the shaft G.

When shaft A is rotated by suitable machinery (not shown) it revolves with it the shafts E G C and all the parts mounted thereon, while the beveled wheel $g$ remains stationary; but as the beveled wheel $h$ meshes with it, as the shaft revolves, the wheel $h$ is turned and the shaft G is rotated on its axis, and this rotary movement is communicated through wheels H, H', and I to the shaft E. Thus as the apparatus revolves around the axis of the vertical shaft A the shafts E G are simultaneously revolved or rotated on their horizontal axes.

By means of the bent arms D D, I am enabled to provide the stirrer with two rotary shafts, (carrying the revolving stirrers, as will be presently described,) one near the bottom of the tub and the other near the top, and I am enabled to operate the two shafts by a single train of gearing.

A series of stirrers, K L, are mounted upon the shafts E and G. They each consist of two paddles, $i\,j$, projecting from opposite sides of a central eye, $k$, through which the shafts E and G are passed when the stirrers are placed in position.

The blades $i$ are fixed parallel to the revolving shaft, E or G, on the end of an arm, $k'$, as is more clearly shown in Fig. 2.

The difference between stirrers K and L is, that in the case of the former the oblique face $l$—that is, the side of the paddle $j$ facing in the direction in which the shafts revolve—is turned toward the central shaft, A, and the center of the mash-tub, while the oblique face $l'$ of the latter is turned from the shaft A and toward the sides of the tub.

The stirrers K L are placed on the shafts E G in suitable succession. By means of the oppositely-set oblique faces the operation of the stirrers will be threefold. For example, the paddles $i$, revolving as they do in vertical planes, stir and agitate the mash vertically up and down alternately. Paddles $j$, with the oblique faces turned toward the shaft A, throw the mash laterally in the direction of the shaft A and the center of the mash-tub, while the paddles $j$, with the oblique faces turned from the central shaft, likewise throw the mash laterally, but away from the center and toward the sides of the mash-tub. In this way a constant change and interchange in the position of the mash takes place in the tub, and thereby a more thorough stirring and agitation of the mash is obtained.

M is the scraper fixed to the lower ends of the rods $e$, that form the rake close to and parallel with the floor of the tub. The lower edge, $m$, of the scraper is inclined in the direction in which the stirrer revolves, and thus operates to scrape up the mash from near the floor and throw it upward, and the ends of the scraper are outward and forward in the direction the stirrer revolves, forming wings $n\,n'$, which are set obliquely to the length of the scraper. The wing $n$ at the inner end serves to throw the mash from the center outward, while wing $n'$ operates to throw the mash from the sides of the tub toward the center.

I claim—

1. The scraper M, with obliquely-set wings $n\,n'$, in combination with the rods $e$ and the central shaft, A, substantially as herein described.

2. In combination with the central shaft, A, and T-shaft C, the bent arms D D, shafts E G, carrying stirrers, and the connecting gearing, the shaft E being at one side of the shaft A, substantially as described.

3. A mash-stirrer having a horizontal blade on one side and the oblique blade on the other side of the central hub, substantially as specified.

GUSTAV SCHOCK.

Witnesses:
   WILTON C. DONN,
   TOMPSON B. MOSHER.